US006997413B2

(12) United States Patent
Wukowitz

(10) Patent No.: US 6,997,413 B2
(45) Date of Patent: Feb. 14, 2006

(54) FLYING AMPHIBIOUS SUV

(75) Inventor: Edward Wukowitz, 1812 Lagoon La., Cape Coral, FL (US) 33914

(73) Assignee: Edward Wukowitz, Glen Allen, VA (US)

(*) Notice: Subject to any disclaimer, the term of this patent is extended or adjusted under 35 U.S.C. 154(b) by 85 days.

(21) Appl. No.: 10/828,777

(22) Filed: Apr. 22, 2004

(65) Prior Publication Data

US 2005/0236520 A1    Oct. 27, 2005

(51) Int. Cl.
*B64C 35/00* (2006.01)
(52) U.S. Cl. .................................. 244/106; 244/91
(58) Field of Classification Search ............ 244/201, 244/199, 105, 106, 203, 204, 91, 131, 119
See application file for complete search history.

(56) References Cited

U.S. PATENT DOCUMENTS 1,551,983 A * 9/1925 Dornier ..................... 244/105
3,145,954 A * 8/1964 Jenny et al. ................ 244/105
3,854,679 A * 12/1974 Smethers, Jr. .............. 244/106
4,998,689 A * 3/1991 Woodcock .................... 244/46
5,222,694 A * 6/1993 Smoot ........................ 244/119
6,113,028 A * 9/2000 Lohse et al. .................. 244/13
6,367,737 B1 * 4/2002 Lohse et al. .................. 244/13

* cited by examiner

*Primary Examiner*—Tien Dinh
(74) *Attorney, Agent, or Firm*—Werner Schroeder

(57) ABSTRACT

The amphibious aircraft has two top mounted wings and an engine having a rear mounted propeller. The aircraft also has a tail having two wings mounted in a V-shaped fashion. Each of the wings has a pivotal tip mounted thereon. The aircraft also has a sponson on each side of the fuselage by way of horizontally mounted struts. The struts and thereby the sponsons are mounted to the aircraft in such a manner so that they are adjustable in their horizontal attitude. The pivotal wing tips at the top mounted wings control the yaw of the aircraft while the adjustable wing tips in the V section of the aircraft can control both the horizontal direction of the aircraft as well as the right or left direction. It all depends if both the wing tips are pivoted in the same direction or opposite to each other, respectively.

12 Claims, 5 Drawing Sheets

FLYING AMPHIBIOUS SUV

CROSS REFERENCE TO RELATED APPLICATIONS (none)

STATEMENT REGARDING FED SPONSORED R & D (none)

BACKGROUND OF THE INVENTION

Stable dynamic flight requires a "3 axis" function control. With a few exeptions this is usually achieved in a most conventional aircraft by the modulated actuation of at least 5 or more movable trailing edge surfaces applied on 3 major separate structural components, ie., wing, horizontal elevator and vertical rudder.

BRIEF SUMMARY OF THE INVENTION

The SUV in the title means "Sport Utility Vehicle". The inventive design requires the single structural component of a V-tail unit with only two moving surfaces of their outboard rotating tips to achieve a 3-axis functional control. With a perfectly balanced rotating tip (weight ratio) and a proper sizing in area, span, aspect ratio moment aim to CG. and V angle will guarantee flutter elimination and not requiring compensating balancing weigth to effectively reduce weight and drag.

A satisfactorily operating rotating or pivoting tip mechanism within or of fixed or an auxiliary ventral fence element arrangement and/or optional mixing control measures will cure an inherent or adverse roll inclination in a yaw mode and benefits of improved performance and increased safety and economy will result. The aircraft achieves a three axis control through the use of two pivotal outboard wing tips on a high wing design and a V-tail structure that ensures flutter-free operation.

BRIEF DESCRIPTION OF THE DRAWINGS

The V-tail has the same arrangement, only smaller. There is also the ventral fence which is fastened to each of the tail sections at their respective ends. This system will also be explained below. The air plane is an amphibious plane because it can operate on water as well as on land. The water operation is handled by sponsons 14 that are adjustably fastened to the bottom or center fuselage 4 by way of struts 15. there are also retractable landing gears 16 for any land operation. 18 and 19 indicate threaded bolts to fasten the struts 15 to the center fuselage 4. The character 13 indicates the air intakes for cooling the engine whether air cooled or water cooled. As can be seen from FIG. 1, the engine is rear mounted relative to the plane forward movement and, therefore, drives the air plane by way of suction rather than by air pressure. In this arrangement, the wash or pressure of the propeller is taken advantage of by using a reversible maneuvering control element 12. This element consists of a planar construction by using two lateral rods having a piece of canvas there between. In FIG. 1 the element is shown in a down position in a solid line but can be moved to an up position as shown by the arrow. In an up position, the control element can be moved into a multiple position into the wash of the propeller. In a straight up and back position, the control element will act as a brake of the air stream and a side position and turned in a slanted position relative to the air wash of the propeller, the fuselage can be turned sideways for a steering control. Turning now to the V-tail configuration, the wing tip 10 acts in a similar manner as was explained above with the wing tips 8. The wing tips 10 on the wings of the V-tail can act in two different ways. When controlled to move up and down simultaneously in the same directions, the wing tips will act as a horizontal control as on conventional air planes. But when they move simultaneously but in opposite directions they act like a rudder to turn the fusillade either in a left or a right turn as a rudder does on a conventional air plane.

Figure 3:
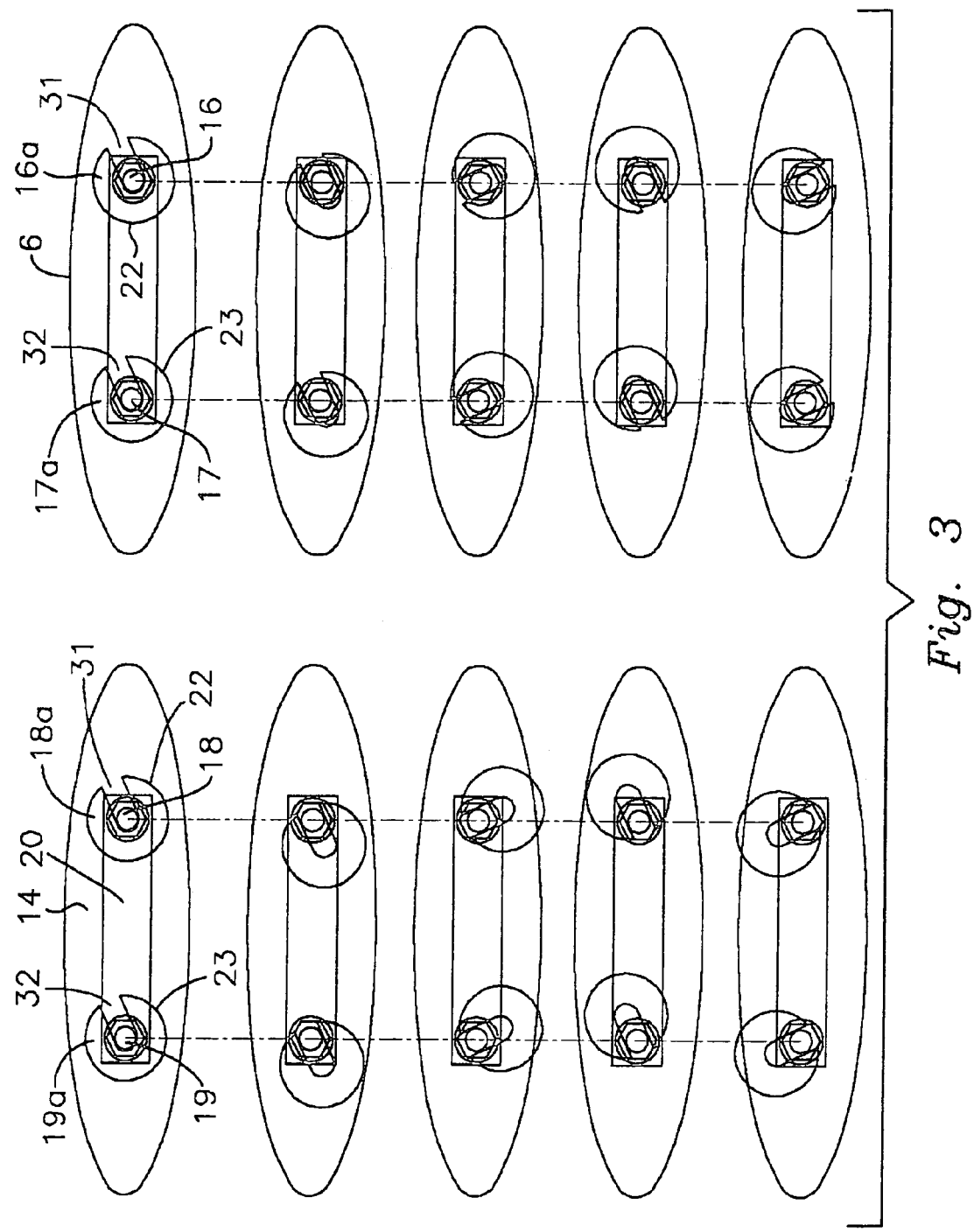
FIG. 3 shows a very simple and easy way of fastening the sponson and the V-tail elements. As mentioned above, the sponsons and the wing tips of the V-tail elements are adjustable into certain predetermined positions. The same reference characters are being used as were in FIG. 1. The right side of FIG. 2 represents the various elements needed to make an adjustment of the V-tail wings and the left side shows the adjustments to be made for the sponson relative to the center fuselage 4. In the adjustment for the wings of the V-tail sections in the upper right hand corner the same reference characters are used as were in FIG. 2. The reference character 6 represents the wall on one end of the wings in the V-tail section. The characters 22 and 23 are the circular openings in the wall 6 of the V-tail wing which will receive the slotted control washers 31 and 32 which will remain movable or rotatable therein. The treaded bolts 16 and 17 pass through the slotted control washers 31 and 32 and are then fastened by the nuts 16b and 17b, respectively. Before tightening the nuts, the bolts 16 and 17 are placed into their respective positions by the rotation of the slotted control washers 16a and 17a. when rotating the slotted control washers, the threaded bolts received therein will assume different positions relative to a horizontal plane. The four Figs. located below the upper right hand corner Fig. did not receive any reference characters because all of the elements are the same. But a study of these Figs. makes it clear how the rotations of the slotted control washers influence the position of the V-tail wings.

Turning now the left side of FIG. 3, there is shown the same basic arrangement as to how the sponson 14 should be adjusted relative to the strut 15 that connects the sponson relative to the center fuselage 4. The wall of the sponson 14 has circular openings therein to accommodate the slotted control washers 18a and 19a therein. At the inside of the wall of the sponson 14 there is placed a control plate 20 which also will control an exact distance between the threaded bolts 18 and 19 no matter in which horizontal position they happen to be at any time. The slotted washers 18a and 19a receive the threaded bolts 18 and 19 and when the slotted washers 18a and 19a are rotated, the bolts 18 and 19 located therein are moved to different positions either vertically or horizontally to thereby change the attitude of the sponson correspondingly. Again the bolts 18b and 19b, when tightened, will fix the desired position. The four Figs. below the top Fig. did not receive any reference characters because the elements shown therein are all the same. A study of these Figs. will reveal that only the threaded bolts 18 and 19 will change their position upon turning the slotted washers 18a and 19a. Therefore, it can seen that the operation of adjusting the wings of the V-tail is the same as that of adjusting the sponsons.

Figure 4:
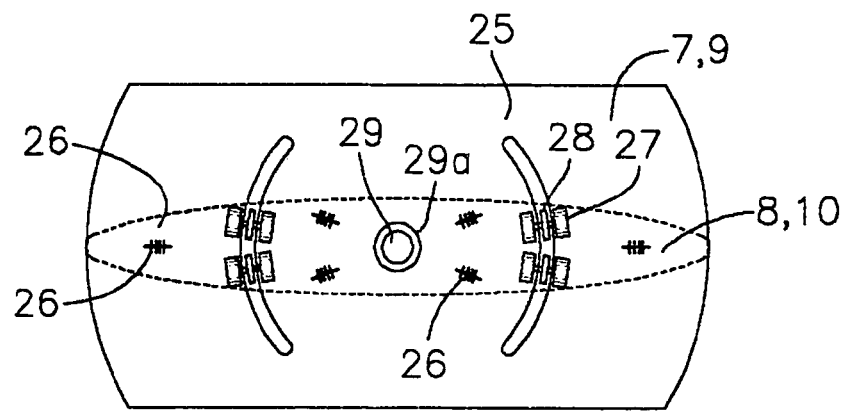

FIG. 4 illustrates the movement of the pivotal wing tips 8 on the wing tips and the pivotal wing tips 10 on the V-tail wings. The ventral fence 7 or 9 has a circular slot 25 therein. The ends of the wing tips 8 or 10 have a solid plate thereon which carry rollers or bearings 26. There can be a multiple of rollers for accuracy of operation so that the counter plates on the wing tips 7 or 9 and the counter plates of the ventral fences cannot cant relative to each other, that is, they remain in a true parallelism fashion. To guide the two plates relative to each other and to reduce the friction there between there are provided carriage rollers 27 which roll between the two walls adjacent to the slots 25. There can be only one set of double rollers or two sets as is shown in FIG. 4. FIG. 4 also shows the outline of a torque tube 29 within a bearing 29a. This tube will be explained below. It now can be seen that the wing tips 8 or 10 can easily be pivoted relative to the ventral fences 7 on the wing tips and the wings of the V-tail 6.

Figure 1:
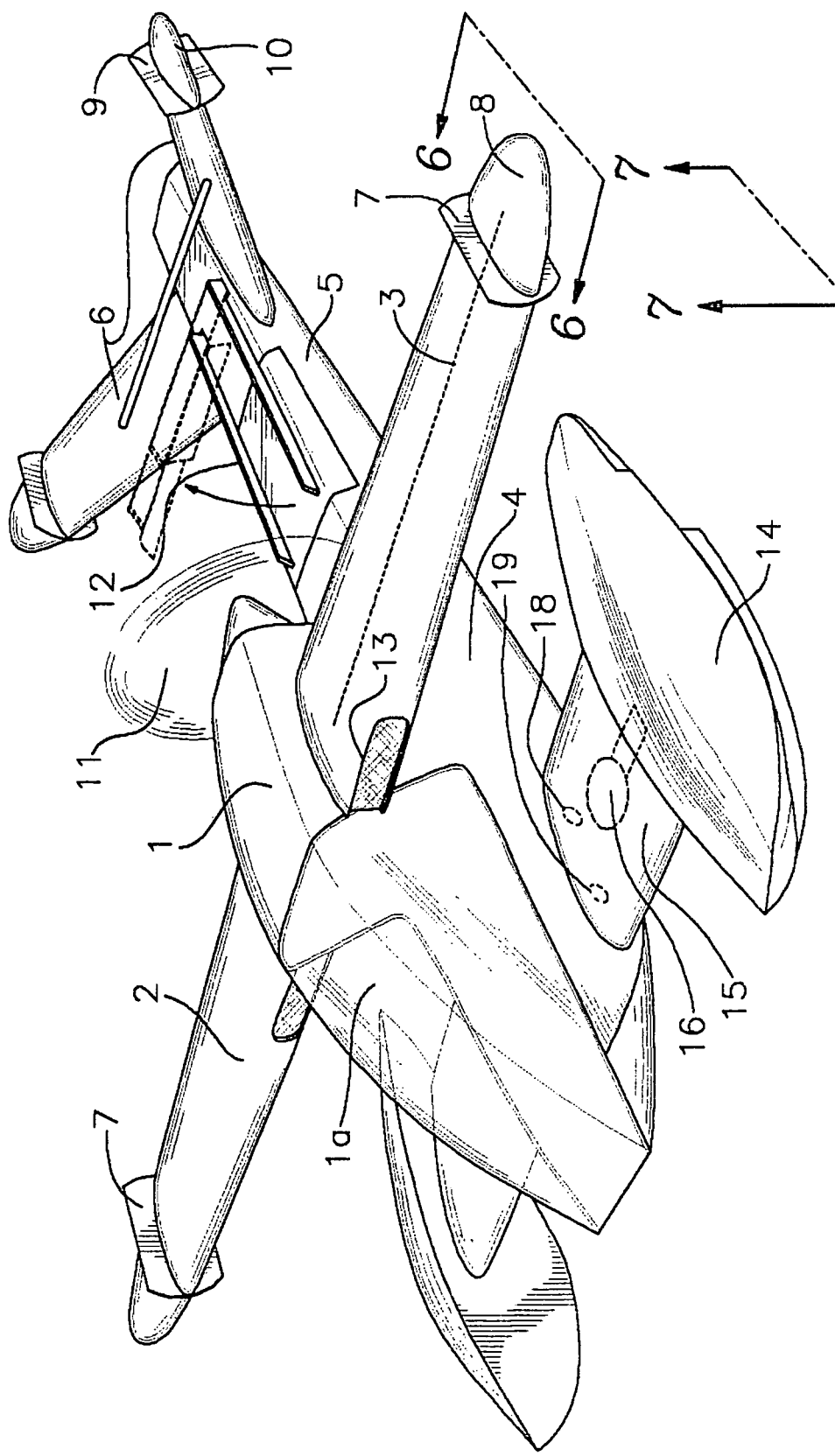
FIG. 1 is a perspective and overall view of the aircraft general configuration sizings that can be scaled and modified to suit more specific and particular requirements. Of major significance is the optional capability of pure jet propulsion as the high position and well aft V-tail ideally provides and wherein 1 indicates the cabin and the supporting structure and a glass canopy which can be sliding or hinged to open and close the same. 4 indicates the center fuselage at the bottom of the cabin 1 having the engine mounted therein driving the propeller 11. the rear fuselage of the tail is indicated at 5. There is a V-tail 6 which is adjustable in height and attitude which will be described below. Both wings 2 and 3 each have a ventral fence 7 fastened to the wing tips. The pivotal wing tips take the place of the well known ailerons which control the horizontal attitudes and roll function of a plane.
Figure 2:
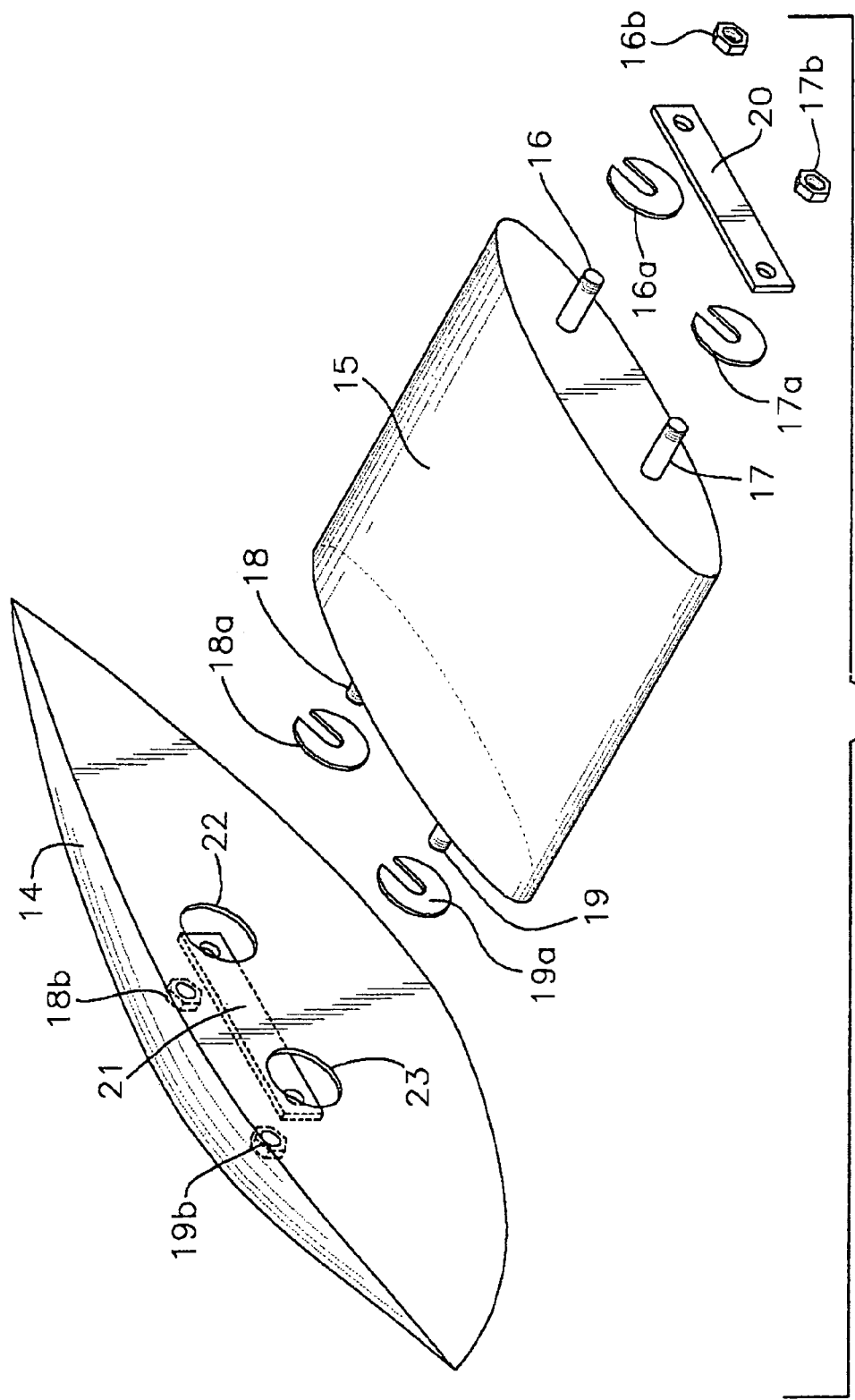
FIG. 2 is an illustration of the connection and control of either strut as it is connected to the center fuselage 4 of the air plane. This Fig. is also a depiction of the wing tips of the V-shape tail section. The strut is shown at 15. The right side of FIG. 2 shows the connection of the strut to the center fuselage 4. The strut 15 has located at one end two threaded bolts 16 and 17 which are fastened to the center fuselage 4. The bolts 16 and 17 are accessible from the inside of the fuselage. Intermediate the threaded bolts 16 and 17 are two slotted washers 16*a* and 17*a* which abut against the control plate 20. The control plate can control the attitude of the struts relative to the fuselage. The slots in the control washers allow the struts to be turned into desirable positions and remain therein once the nuts 16*b* and 17*b* are tightened to make this connection a solid unit. The other side of strut 15 has similar control elements. Again, there are threaded bolts 18 and 19 which will connect the strut 15 to the sponson 14. Again there are slotted control washers 18*a* and 19*a* which will slip over the threaded bolts 18 and 19. The slotted control washers 18*a* and 19*a* are received within the circular openings 22 and 23 in a solid wall of the sponson. The sponsons are accessible from the inside so that the nuts 18*b* and 19*b* can be received over the threaded ends of the bolts 18 and 19, respectively. The control plate 20 (shown on the right side of FIG. 2) presents a counter force for slotted washers 18*a* and 19*a* within the circular openings 22 and 23 while at the same assuring a steady distance between the threaded bolts 18 and 19. The operation of theses connections will be explained and demonstrated in FIG. 3.
Figure 5:
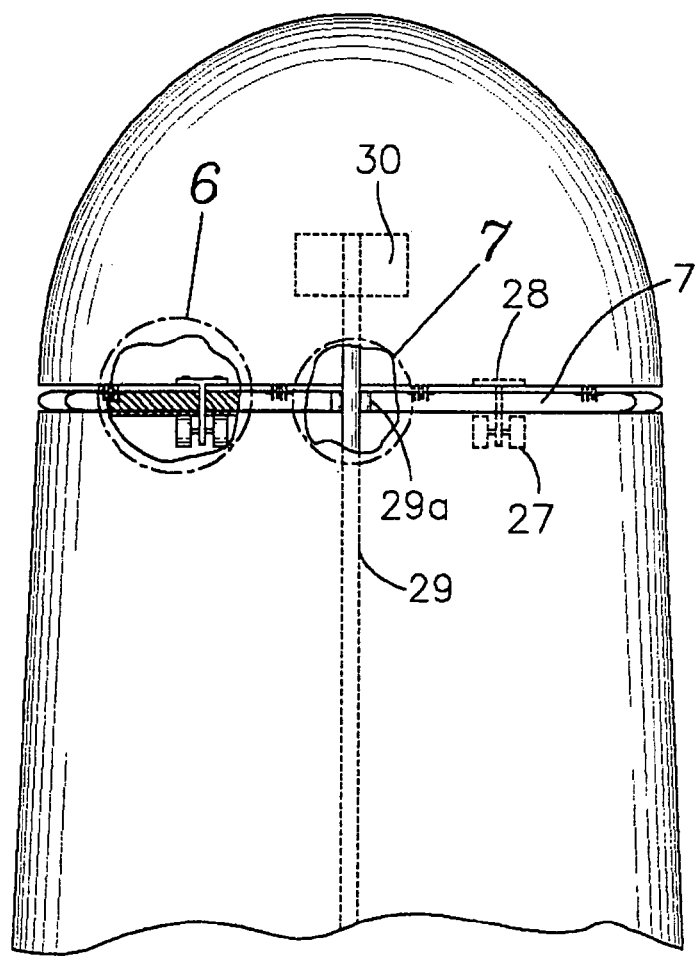

FIG. 5 is a top view of the wing tip view of the wing tip 7 of the end of the wing 3. This view is equally applicable to the wing tip of the V-tail 6. The reference character 6 is following the view →6← of FIG. 1 and the reference character 7 is following the view →7← of FIG. 1. The character 6 illustrates the roller bearings 26 of FIG. 4 in more detail. The roller bearings 27 are supported by a bracket and trunnion support 28 on the inside wall of the wing tip 8 and through the ventral fence 7. to roll against the outer wall of the wing end 3. The pivotal wing tip 8 is operated by a torque tube or rod 29 through a bearing 29a located in the ventral fence 7. the torque tube 29 is supported within the wing tip 8 by way of a bracket or support plate 30. When the torque tube is turned by way of a mechanism within the cabin 1, the wing tip 8 will turn in the direction controlled by the pilot operating the above mentioned mechanism. The same is true with regard to controlling the wing tips in their attitude during flight of the air craft and under control of the pilot.

Figure 6:
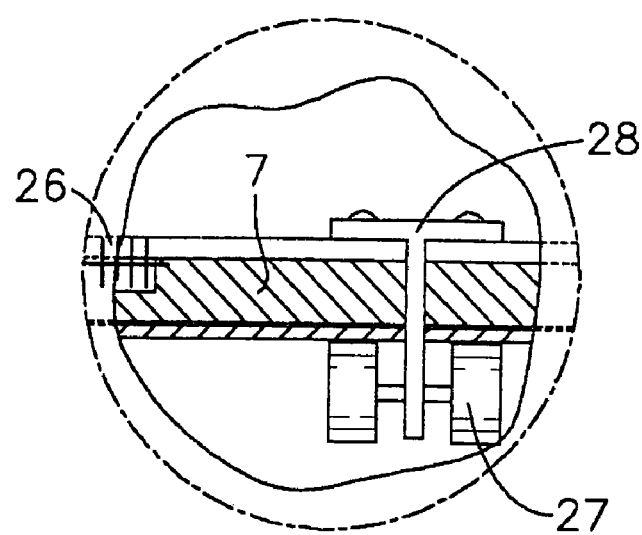

FIG. 6 is a close up view of how the roller bearings are mounted on the inside of the wall of the wing tips 8 and 10. The central wall or fence is shown at 7 or 9. The inside wall of the fence has a bracket and trunnion 28 which passes through the wall of the fence 7. on the other side of the fence. The rollers 27 are in intimate contact with the wall of the fence 7. The reference character 26 indicates the stabilizing bearings 26.

Figure 7:
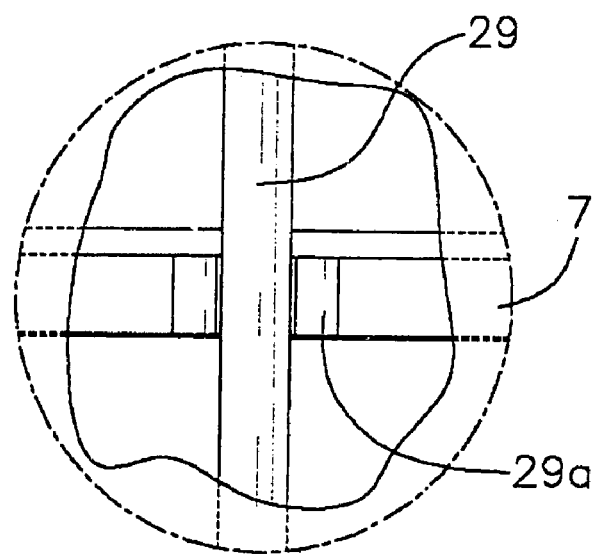

FIG. 7 illustrates the ventral fence 7 having the torque tube 29 passing there through being supported by the bearing 29a.

In view of all of the above it now be seen that a unique control system for an amphibious air craft has been developed. The controls use only two control mechanisms by the pilot to control the three aspects necessary to control an air plane in flight by the pilot. 1) The control of the horizontal or yaw of the air plane is controlled by the aileron. 2) The control of the horizontal or up and down of the airplane is the elevator of the tail. 3) The control of the direction of the air plane. (The rudder).

What is claimed is:

1. An amphibious aircraft having an engine and top wings and a V-tail section, said V-tail consisting of two wings placed in a V configuration, each of the two top wings and the wings in the V-tail section having pivotal wing tips, said airplane further having sponsons having means thereon for adjusting said sponsons in their horizontal attitude.

2. The amphibious aircraft of claim 1, wherein said engine has a rear mounted propeller.

3. The amphibious aircraft of claim 1 including a ventral fence mounted to each end of said wings on which the operating elements of said pivotal wing tips are mounted.

4. The amphibious aircraft of claim 3, wherein said pivotal wing tips are pivoted by a torque tube fastened to the wing tips and running along the length of each of said wings.

5. The amphibious aircraft of claim 3, wherein said torque tube is supported by way of a bearing located in each of said ventral fences.

6. The amphibious aircraft of claim 3 including a multiple of bearings located on each of said ventral fences to reduce any friction between the ventral fences and a wall of said pivotal wing tips.

7. The amphibious aircraft of claim 5 including at least two circular slots located equidistant around said torque tube of said ventral fence, said at least two circular slots receive brackets there through, said brackets are mounted on an inside wall of each of said pivotal wing tips, each of said brackets forming a trunnion on the other side of said ventral fence to support two rollers thereon to guide each of said wing tips relative to their respective ends of said wings.

8. The amphibious aircraft of claim 1, wherein said sponsons each are connected to said aircraft by struts having two ends, one of said ends is mounted to said aircraft and another end is mounted to a sponson, each of said ends having threaded screws thereon.

9. The amphibious aircraft of claim 8, wherein a wall of each of said sponsons and a wall of said aircraft have circular openings therein, said circular openings each receive a slotted washer therein to be rotatable therein, a counter plate is mounted on another side of said wall of said sponson, said threaded screws are passing through said slotted washers and said counter plate, said threaded screws each have a nut thereon to be tightened against said counter plate where upon a rotation of each of said slotted washers will change the attitude of each said threaded bolts and thereby the horizontal attitude of each of said sponsons.

10. The amphibious aircraft of claim 1 including landing or take-off wheels included in said aircraft.

11. The amphibious aircraft of claim 1 including means for braking and steering the aircraft while on the ground.

12. The amphibious aircraft of claim 11, wherein said means for braking the aircraft is a stand-up plane in front of said V-tail section, a wash of the propeller will impact against said plane and when turning said plane, the wash of said propeller against said turned plane will divert said V-tail section into a different direction.

\* \* \* \* \*